(12) United States Patent
Tricard et al.

(10) Patent No.: US 6,746,310 B2
(45) Date of Patent: Jun. 8, 2004

(54) UNIFORM THIN FILMS PRODUCED BY MAGNETORHEOLOGICAL FINISHING

(75) Inventors: Marc Tricard, Fairport, NY (US); William Kordonski, Webster, NY (US)

(73) Assignee: QED Technologies, Inc., Rochester, NY (US)

( * ) Notice: Subject to any disclaimer, the term of this patent is extended or adjusted under 35 U.S.C. 154(b) by 0 days.

(21) Appl. No.: 10/213,631

(22) Filed: Aug. 6, 2002

(65) Prior Publication Data

US 2004/0029493 A1 Feb. 12, 2004

(51) Int. Cl.$^7$ .............................................. B24B 49/00
(52) U.S. Cl. ................... 451/36; 451/5; 451/8; 451/41; 451/60; 451/285
(58) Field of Search ...................... 451/5, 8, 36, 41, 451/56, 60, 72, 87, 93, 178, 221, 242, 285, 109, 111, 113, 721; 137/92

(56) References Cited

U.S. PATENT DOCUMENTS

| | | | | |
|---|---|---|---|---|
| 5,616,066 A | * | 4/1997 | Jacobs et al. ................. | 451/36 |
| 5,839,944 A | * | 11/1998 | Jacobs et al. ................. | 451/8 |
| 5,951,369 A | * | 9/1999 | Kordonski et al. ............ | 451/5 |
| 6,506,102 B2 | * | 1/2003 | Kordonski et al. ............ | 451/64 |

* cited by examiner

*Primary Examiner*—Joseph J. Hail, III
*Assistant Examiner*—Anthony Ojini
(74) *Attorney, Agent, or Firm*—Neal L. Slifkin; Harris Beach LLP

(57) ABSTRACT

An improved method for producing a thin layer having highly uniform thickness, which layer may be pre-coated on an undulating surface of a substrate element. A working layer of the material is formed having a thickness greater than the final thickness desired. An areal (XY) determination of working layer thickness is made by ellipsometry, laser interferometry, or x-ray diffraction, or other known means. A map of thicknesses to be removed from the free surface of the working layer is entered into the control system of a magnetorheological finishing apparatus. The working layer is mounted on a workpiece holder of the apparatus and correctly indexed to the machine. The machine then removes material by magnetorheological finishing as instructed by the control system to leave a residual layer having a very high degree of thickness uniformity at a nominal average thickness and a very high surface integrity.

7 Claims, 2 Drawing Sheets

UNIFORM THIN FILMS PRODUCED BY MAGNETORHEOLOGICAL FINISHING

BACKGROUND OF THE INVENTION

1. Field of the Invention

The present invention relates to production of thin films; more particularly, to such films having a high degree of thickness uniformity; and most particularly, to a method wherein an magnetorheological fluid finishing system programmably removes material from a thin layer, which may have been previously coated to a non-uniform substrate to leave a layer having a very high level of thickness uniformity.

2. Discussion of the Related Art

Use of magnetically-stiffened magnetorheological fluids for abrasive finishing and polishing of substrates is well known. Such fluids, containing magnetically-soft abrasive particles dispersed in a liquid carrier, exhibit magnetically-induced plastic behavior in the presence of a magnetic field. The apparent viscosity of the fluid can be magnetically increased by many orders of magnitude, such that the consistency of the fluid changes from being nearly watery to being a very stiff paste. When such a paste is directed appropriately against a substrate surface to be shaped or polished, for example, an optical element, a very high level of finishing quality, accuracy, and control can be achieved. A typical MRF finishing system is the QED Technologies Q22 MRF System, available from QED Technologies, Rochester, N.Y., USA.

In a typical magnetorheological finishing system, a work surface comprises a vertically-oriented wheel having an axially-wide rim which is undercut symmetrically about a hub. Specially shaped magnetic pole pieces are extended toward opposite sides of the wheel under the undercut rim to provide a magnetic work zone on the surface of the wheel, preferably at about the top-dead-center position. The surface of the wheel is preferably an equatorial section of a sphere.

Mounted adjacent to the work zone is a substrate receiver and work holder for extending a substrate to be finished into the work zone. The finishing system may be programmed to move the work holder in a plurality of modes and speeds of motion to remove more or less material from the workpiece by varying the areal location of work and speed of travel of the workpiece through the work zone, and therefore the exposure time in the work zone. The finishing may be carried out at any desired angular orientation of the work zone on the carrier wheel, e.g., the workpiece may be positioned on a controllable bed, the carrier wheel positioned over the substrate, and a work zone provided at the bottom dead center position on the carrier wheel.

It is known in the art of thin layer fabrication to coat very thin layers of materials onto substrates. Such layers can be very useful in, for instance, the field of micro-electronics fabrication. For example, it is known to coat a thin layer of silicon on a glass surface of a silicon wafer, the glass being an insulator ("silicon on insulator", or SOI). It is highly desirable that the silicon layer be very uniform in thickness, typically about 100 nm, and not have cracks extending into or through the layer.

A serious problem can arise, however, in producing coatings requiring a very high level of thickness uniformity and surface integrity. Non-planarities in the substrate may not be followed conformably by the coatings but may tend to be filled in or rounded in the free surface of the coatings; thus, an actual coating may undesirably have thicker and thinner areas, depending upon the topography of the substrate to which it is coated. In the prior art, producing coatings of extreme thickness uniformity and surface integrity can require very complicated manufacturing process including chemical mechanical polishing.

Even in some of such applications, it can be necessary to mechanically or chemically-mechanically finish the upper surface of the coating, as by conventional optical polishing, to achieve a desired absolute thickness. However, such grinding, because of the mechanical stresses required, is known to leave residual microscopic stress fractures in the polished surface. For ultra-thin layers, such fractures may actually extend all the way through the layer, compromising the mechanical and electrical properties of the layer.

In use, the criterion for suitability of such a coating is not its absolute level of flatness but rather its absolute thickness, level of thickness uniformity, and level of surface integrity. Thus, what is needed is a means for providing an ultra-thin layer having very high thickness uniformity and high surface integrity, especially when coated on a substrate having surface non-planar excursions which may be as great as, or greater than, the thickness of the coated layer itself.

It is further needed to be able to provide such a layer with minimal residual stress damage to the layer.

OBJECTS OF THE INVENTION

It is a principal object of the invention to provide a method for producing thin layers, and especially on non-planar substrates, wherein the layer so produced has a high level of thickness uniformity and freedom from surface cracks.

It is a further object of the invention to provide a method for finishing of thin layers wherein the finishing leaves minimal stress fracturing of the free surface of the thin layer.

BRIEF DESCRIPTION OF THE INVENTION

Briefly described, in an improved method for producing a thin layer having highly uniform thickness and freedom from surface or sub-surface cracking, a working layer of the material is formed at a thickness greater than the final thickness desired. The layer may be an independent element or may be formed as a coating on a carrier substrate. An areal (XY) determination of working layer thickness is made by a known technique, such as ellipsometry, laser interferometry, or x-ray diffraction. A currently preferred means is an AcuMap II device, available from ADE Technologies, Inc., Newton, Mass., USA. Data representing a map of thicknesses to be removed from the free surface of the working layer are entered into the control system of a magnetorheological finishing apparatus. The independent layer element or the coated substrate element is mounted on a workpiece holder of the apparatus and correctly indexed to the machine. The MRF machine then removes material as instructed by the control system to leave a residual layer having a very high degree of thickness uniformity at a nominal average thickness and having a very high level of surface integrity.

The invention is useful in providing thin films of materials including, but not limited to, ceramics, glass, metals, transition metal oxides, magnetoresistive alloys, aluminum oxide, nitrides, carbides, gallium arsenide, tungsten, silicon, and sapphire.

BRIEF DESCRIPTION OF THE DRAWING

The foregoing and other objects, features, and advantages of the invention, as well as presently preferred embodiments thereof, will become more apparent from a reading of the following description in connection with the accompanying drawings in which.

DETAILED DESCRIPTION OF THE INVENTION

Figure 1:
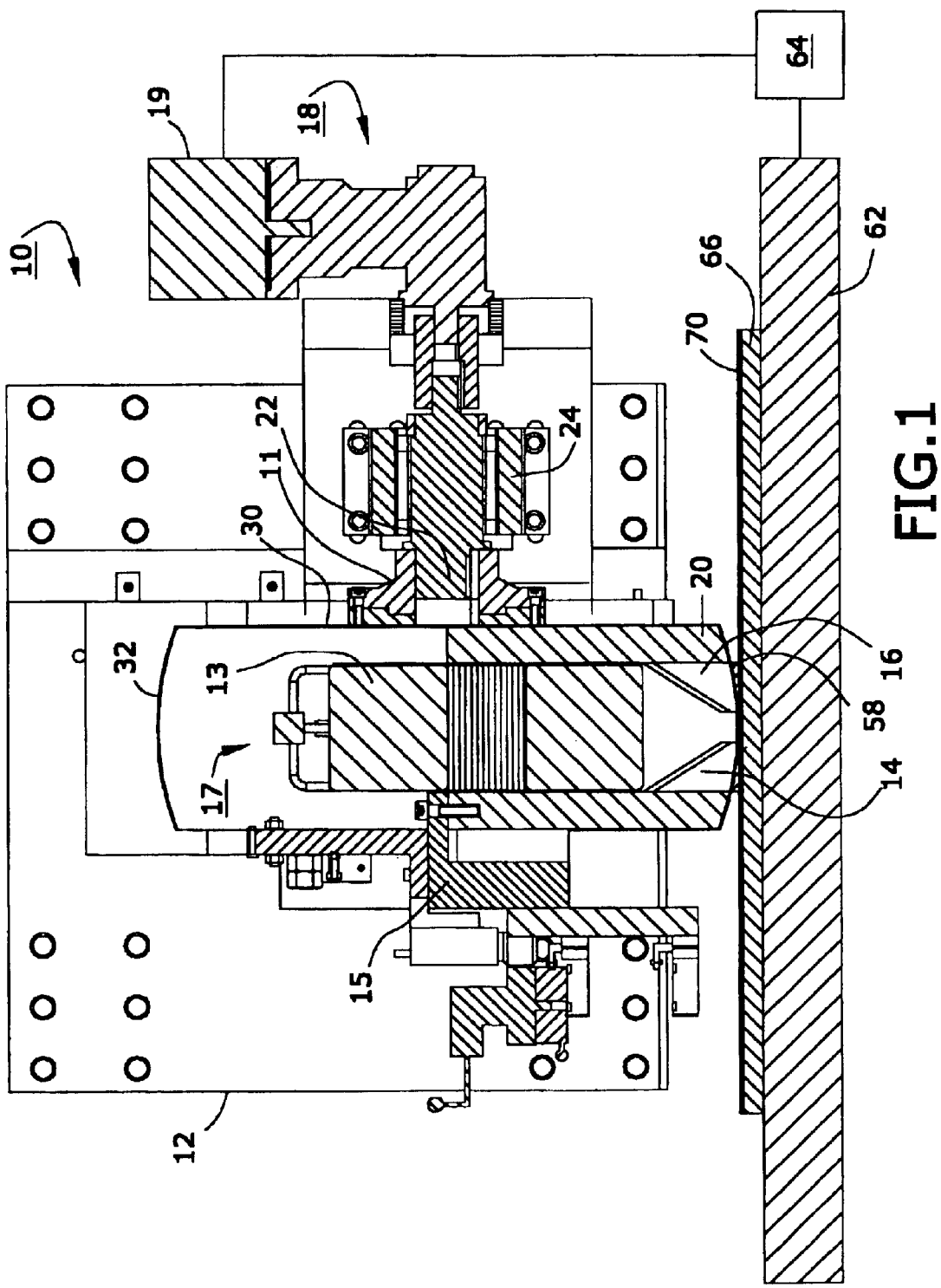
FIG. 1 is an an elevational cross-sectional view of a magnetorheological finishing apparatus in accordance with the invention, showing the apparatus in use for finishing an upper surface of a substrate on a movable bed.

Referring to FIG. 1, magnetorheological finishing system 10 suitable for use in a method in accordance with the invention (for example, a Q22 System available from QED Technologies, Rochester, N.Y., USA) includes a base 12 and first arm 15 for supporting a magnet assembly 17. Assembly 17 includes the core and windings 13 of an electromagnet and left and right magnet yoke members 14, 16, respectively, which are preferably planar slabs having radial ends conformable to spherical carrier wheel 20, and which are connected conventionally to the core. Second bracket 11 extending from base 12 supports a shaft 22 journalled in bearings 24 and a motor drive unit 18 cantilevered therefrom. Drive unit 18 is controlled by a drive controller (not shown) in conventional fashion to control the rotational speed of the drive at a desired aim. Drive unit 18 is further connected to a system controller 19 for coordinating the actions of the various components of the system. Shaft 22 is rotatably coupled to a carrier wheel flange 30 supporting a peripheral surface 32 which extends from flange 30 in the direction away from drive unit 18. Flange 30 and surface 32 together define a generally bowl-shaped carrier wheel 20 which is open on the side opposite flange 30 for receiving magnet assembly 17. Preferably, surface 32 is an equatorial section of a sphere.

An application nozzle (not visible in the cross-section shown in FIG. 1} provides a ribbon of magnetorheological fluid onto moving work surface 32 in known fashion. Preferably, the apparatus is arranged as shown in FIG. 1 so that a work zone 58 can be formed at the bottom dead center position of carrier wheel 20 for finishing of planar substrates which may conveniently be mounted on a substage or bed 62 operationally connected to a computer-controlled 5-axis positioning machine 64 in known fashion, whereby the speed and direction of a planar substrate with respect to the work zone 58 may be precisely controlled. Machine 64 is a subsystem and integral part of magnetorheological finishing system 10 and is controlled by system controller 19. Alternatively, of course, a substrate may be mounted as desired at any angle to surface 32, in accordance with known technology.

Figure 2:
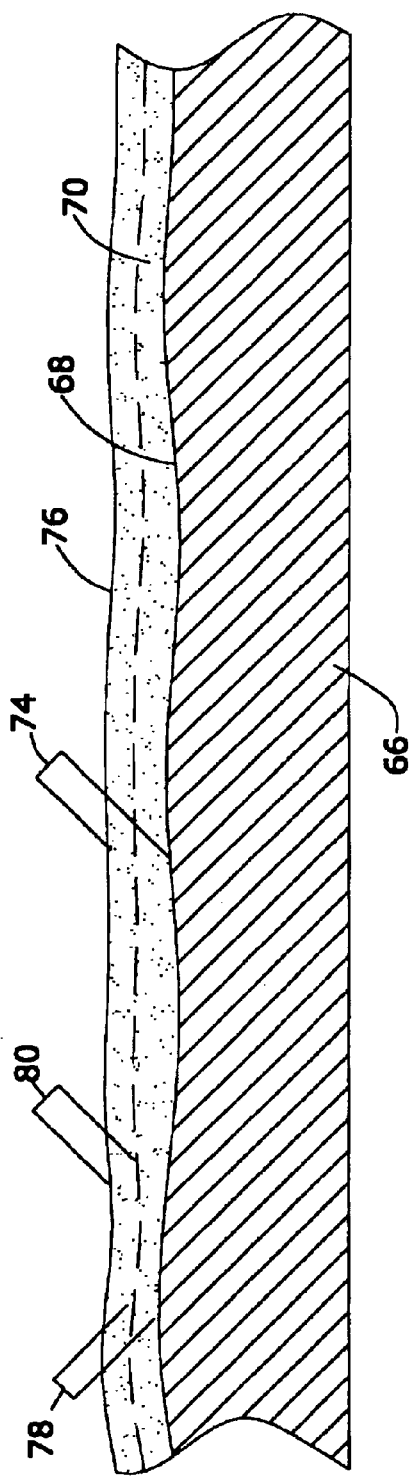
FIG. 2 is a schematic elevational cross-sectional view of a working layer coated on an undulating, non-planar substrate surface.
Figure 3:
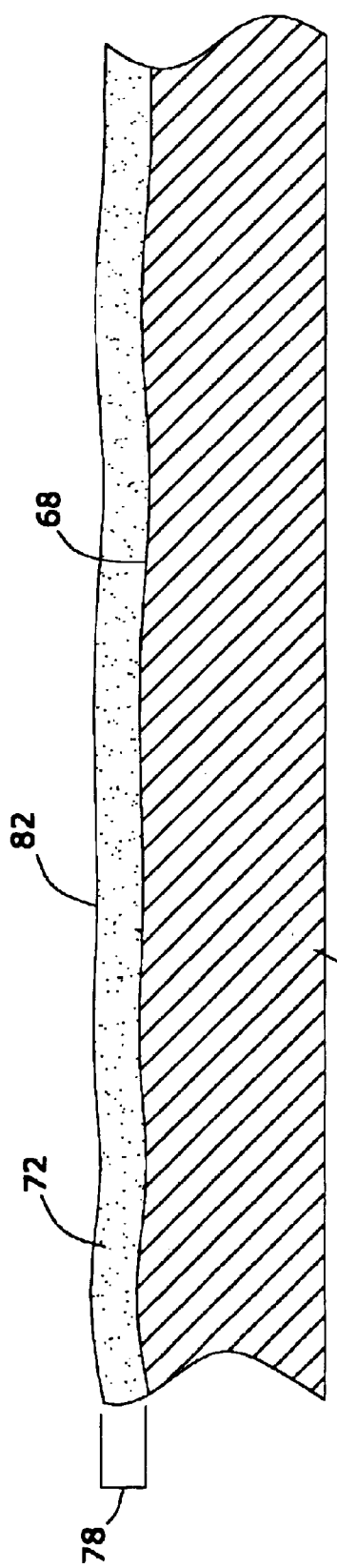
FIG. 3 is a view like that shown in FIG. 2, showing a uniform-thickness finished layer conformal with the non-planar substrate surface in accordance with the invention.

Referring now to FIGS. 1 through 3, a substrate 66 having a non-planar upper surface 68 (vertical scale of non-planarities highly exaggerated for illustration) is coated with a working layer 70 of a material to be finished into a highly uniform layer 72 in accordance with the invention. The working layer may optionally be provided with an undercoat on surface 68, for example, to promote adhesion of 70 thereto or to electrically or optically insulate working layer 70 from the substrate; such an optional undercoat should be understood, although it is omitted from the drawings for clarity of presentation.

Working layer 70 first is characterized in known fashion by a conventional thin-film measuring device, such as an x-ray crystallography machine, a laser interferometer, or an ellipsometer, and an areal (two-dimensional) data map of coated layer 70 is generated for thickness variations 74 between an upper surface 76 of layer 70 and substrate surface 68. The value of the desired thickness 78 is subtracted from each entered thickness data value, yielding by subtraction an areal thickness map of material to be removed 80 from layer 70 to result in uniform layer 72, which map is programmed into system 10.

Substrate 66 is mounted onto bed 62 and is indexed to system 10 such that the amounts of layer 70 to be removed will be removed from the correct areas. System 10 then proceeds to follow the programmed removal map by varying the direction and translation speed of bed 62 in known fashion. When all of material 80 has been removed, uniform layer 72 having free surface 82 is the result.

It should be noted that magnetorheological finishing exerts very low normal stresses on a substrate parallel to its surface and therefore produces little to no stress cracking of residual surface 82. Further, layer 72 is uniform in thickness within +/−5 nm or less.

Example: A conventional 200 mm silicon wafer is coated with an insulative glass undercoat followed by a silicon working layer having a nominal thickness from the glass surface of 200 nm +/−20 nm. The desired finished thickness of the silicon layer is 100 nm. The working layer thickness is a really characterized and a removal pattern is programmed into a QED Q22 System. The wafer is mounted in the workpiece holder, indexed to the calculated removal pattern, and the removal pattern is carried out, leaving a finished residual silicon layer having a nominal thickness of 100 nm and a variation in thickness of less than +/−5 nm. The surface is free of stress-induced cracks.

It should noted that the foregoing method and apparatus of the invention is equally applicable to independent thin elements which are not coated to carrier substrates. The thickness variation of the working element may be similarly characterized, using internal reflection from the back surface of the element. Like layers coated to substrates, independent elements up to, for example, several millimeters in thickness may be finished to a desired thickness having peak-to-valley (PV) differences sometimes referred as TTV (total thickness variation) of no more than 50 nm, and, in some instances, less than 10 nm.

The invention is useful in a wide variety of applications beyond the silicon wafer application just described. For example, magnetoresistive alloy layers may be finished to very high thickness uniformities for use in read-write heads in the magnetic storage art. Further, extremely hard coatings of materials such as diamond, aluminum oxide, and nitrides may be finished for use as wear-protective layers on otherwise vulnerable elements subject to abrasive damage in use.

The invention is useful in providing thin films of a wide range of materials including, but not limited to, ceramics, glass, metals, transition metal oxides, magnetoresistive alloys, aluminum oxide, nitrides, carbides, gallium arsenide, tungsten, silicon, and sapphire.

From the foregoing description it will be apparent that there has been provided an improved method for forming very thin layers having a high degree of thickness uniformity by magnetorheological finishing. Variations and modifications of the herein described method, in accordance with the invention, will undoubtedly suggest themselves to those skilled in this art. Accordingly, the foregoing description should be taken as illustrative and not in a limiting sense.

What is claimed is:

1. A method for forming a layer element of material having a desired thickness, high thickness uniformity, and high surface integrity from a working layer element having thickness non-uniformities and thickness greater than the desired thickness, comprising the steps of:
   a) generating a first two-dimensional map of values of actual thickness of said working layer element;
   b) generating a second two-dimensional map of values of material to be removed from said working layer element by subtracting the value of said desired thickness from each of said actual thickness values;
   c) programming a magnetorheological finishing system with said map of values of material to be removed;
   d) mounting said working layer element onto said magnetorheological finishing system;
   e) indexing said working layer element to said system; and
   f) removing material by magnetorheological finishing from said working layer element in accordance with said map of values to leave said a residual layer element having said desired thickness, high thickness uniformity, high surface integrity.

2. A method in accordance with claim 1 wherein said working layer element is pre-coated to a carrier substrate.

3. A method in accordance with claim 2 wherein said carrier substrate includes at least one of glass, metals, ceramic, silicon, and sapphire.

4. A method in accordance with claim 1 wherein said working layer element is formed of material selected from the group consisting of ceramics, glass, metals, semiconductors, transition metal oxides, magnetoresistive alloys, aluminum oxide, nitrides, carbides, gallium arsenide, tungsten, silicon, and sapphire.

5. A method in accordance with claim 1 wherein said working layer element has a thickness less than 10 mm.

6. A method in accordance with claim 5 wherein said thickness varies by less than 10 nm.

7. A method in accordance with claim 1 wherein the thickness of said residual layer element varies by less than 50 nm.

* * * * *